United States Patent
Tsuji et al.

(10) Patent No.: US 6,760,237 B2
(45) Date of Patent: Jul. 6, 2004

(54) INVERTER FOR ALTERNATING CURRENT GENERATOR-MOTOR

(75) Inventors: Kimitoshi Tsuji, Susono (JP); Kenji Kataoka, Susono (JP); Shigeru Uenishi, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/339,565

(22) Filed: Jan. 10, 2003

(65) Prior Publication Data

US 2003/0137858 A1 Jul. 24, 2003

(30) Foreign Application Priority Data

Jan. 23, 2002 (JP) ........................... 2002-014804

(51) Int. Cl.$^7$ ............................................... H02H 7/122
(52) U.S. Cl. ........................... 363/55; 363/56.03
(58) Field of Search ............................. 363/131, 132, 363/55, 56.02, 56.03

(56) References Cited

U.S. PATENT DOCUMENTS

| 4,894,762 A | * | 1/1990 | Steinshorn | .................. 363/35 |
| 5,698,955 A | * | 12/1997 | Nii | ............................. 318/139 |
| 5,742,493 A | * | 4/1998 | Ito et al. | ....................... 363/37 |

FOREIGN PATENT DOCUMENTS

| JP | A 10-191691 | 7/1998 |
| JP | A 2001-119979 | 4/2001 |

* cited by examiner

*Primary Examiner*—Bao Q. Vu
(74) *Attorney, Agent, or Firm*—Oliff & Berridge, PLC (57) ABSTRACT

A three phase alternating current generator-motor that serves as a starter motor or the alternator includes switching elements for controlling current. When the three phase alternating current generator-motor generates electricity, current flowing to the switching elements is suppressed by current control units in accordance with quantity of generated electricity. A plurality of rectifying diodes are provided in the three-phase alternating current generator-motor are connected in parallel with the corresponding switching elements.

14 Claims, 10 Drawing Sheets

INVERTER FOR ALTERNATING CURRENT GENERATOR-MOTOR

INCORPORATION BY REFERENCE

The disclosure of Japanese Patent Application No. 2002-14804 filed on Jan. 23, 2002 including the specification, drawings and abstract is incorporated herein by reference in its entirety.

BACKGROUND OF THE INVENTION

1. Field of Invention

The invention relates to an inverter used in an alternating current generator-motor that is provided with both a generator function and a motor function.

2. Description of Related Art

There is a known type of vehicle that does not perform idling of an engine in a stopped state of the vehicle. The vehicle starts the engine with an extremely quiet starter motor each time it pulls away. This type of the vehicle generally employs an alternating current generator-motor as the extremely quiet starter motor. The alternating current generator-motor functions as a generator or an alternator while the vehicle is running normally. When the alternating current generator-motor is made to function as a motor or a starter motor, an inverter is required for converting a direct current power supply of a battery to alternating current and carrying out supply to the alternating current generator-motor. Furthermore, when the alternating current generator-motor is made to function as the generator (alternator), a rectifier is required to convert generated alternating current power to direct current power and store it in the battery. Therefore, a rectifying function for electricity generation is generally added to the inverter for the alternating current generator-motor.

Japanese Patent Application Laid-Open No. 10-191691 discloses an example of a known inverter for an alternating current generator-motor that can be applied to a vehicle and the like. As disclosed in the publication, a power control device includes multiple groups of switching elements and diode elements that are respectively connected in parallel, and a thermistor that detects overheating of the diode elements. The power control device controls an inverter module for controlling drive of a generator-motor and each of the switching elements of the inverter module. Then it is determined whether the diode elements have overheated on the basis of an output of the thermistor. The power control device includes a switching control circuit that suppresses or stops electricity generation of the generator-motor if it is determined that overheating has occurred so as to control drive and electricity generation of the three phase alternating current type generator-motor.

According to the aforementioned type of the inverter, if the diode elements overheat while the alternating current generator-motor is operating as the generator, electricity generation is suppressed so as not to cause failure in the switching elements connected to the diode elements. Energy efficiency, however, may be reduced because electricity generation is suppressed, resulting in insufficient power generation.

SUMMARY OF THE INVENTION

It is an object of the invention to provide an inverter for an alternating current generator-motor that is able to carry out sufficient electricity generation while preventing overheating of a diode that is formed on a switching element, while the alternating current generator-motor is made to operate as a generator.

An inverter for an alternating current generator-motor connected between the alternating current generator-motor and a charging-discharging unit is provided with a plurality of switching elements, each of which is controlled to convert a direct current electricity supplied from the charging-discharging unit into a three phase alternating current electricity so as to be supplied to the alternating current generator-motor that is functioning as a motor, a plurality of body diodes connected to the plurality of switching elements correspondingly. Each of the plurality of body diodes is operative to convert the alternating current generated by the alternating current generator-motor that is functioning as a generator into the direct current so as to be supplied to the charging-discharging unit. The inverter further includes a plurality of rectifying diodes connected in parallel with the corresponding plurality of body diodes, and at least one current controller that suppresses a flow of an electric current to each of the body diodes when the alternating current generator-motor generates electricity.

In one preferred embodiment of the invention, a current flowing in a body diode may be reduced. When this occurs, because a current is able to flow in a rectifying diode, it is possible to carry out sufficient electricity generation while preventing overheating due to overcurrent in the body diode.

Preferably the current controller is operative to interrupt a flow of the current directed to each of the plurality of body diodes when the alternating current generator-motor generates electricity.

In the preferred embodiment of the invention, the body diode does not generate any heat whatsoever because the current does not flow in the body diode even during electricity generation.

It is preferable to provide the inverter with a current detector that detects a current flowing to the charging-discharging unit when the alternating current generator-motor generates electricity. An amount of generated electricity is controlled in accordance with a detected value of the current detector.

In general, control of a charging current for a charging-discharging unit is achieved by controlling an exciting current in response to a voltage of the charging-discharging unit. If a state of charge of the charging-discharging unit is low, however, the voltage will not rise even if the charging current flows, and the current will continue to increase until the voltage rises. In the above case, however, if the amount of electricity generation is controlled in response to a detection value of a current detector, overcurrent can be prevented even when the voltage of the charging and discharging unit is low.

The current detector may be formed as a multi-functioning switching elements on a current path between the charging-discharging unit and the rectifying diode, formed to calculate a current value on the basis of a potential difference generated in a predetermined section on the current path between the charging-discharging unit and the rectifying diode, or formed as a transistor connected in parallel with the rectifying diode.

DETAILED DESCRIPTION OF PREFERRED EMBODIMENTS

An inverter for an alternating current generator-motor according to an exemplary embodiment of the invention will be explained with reference to the drawings.

First Embodiment

Figure 1:
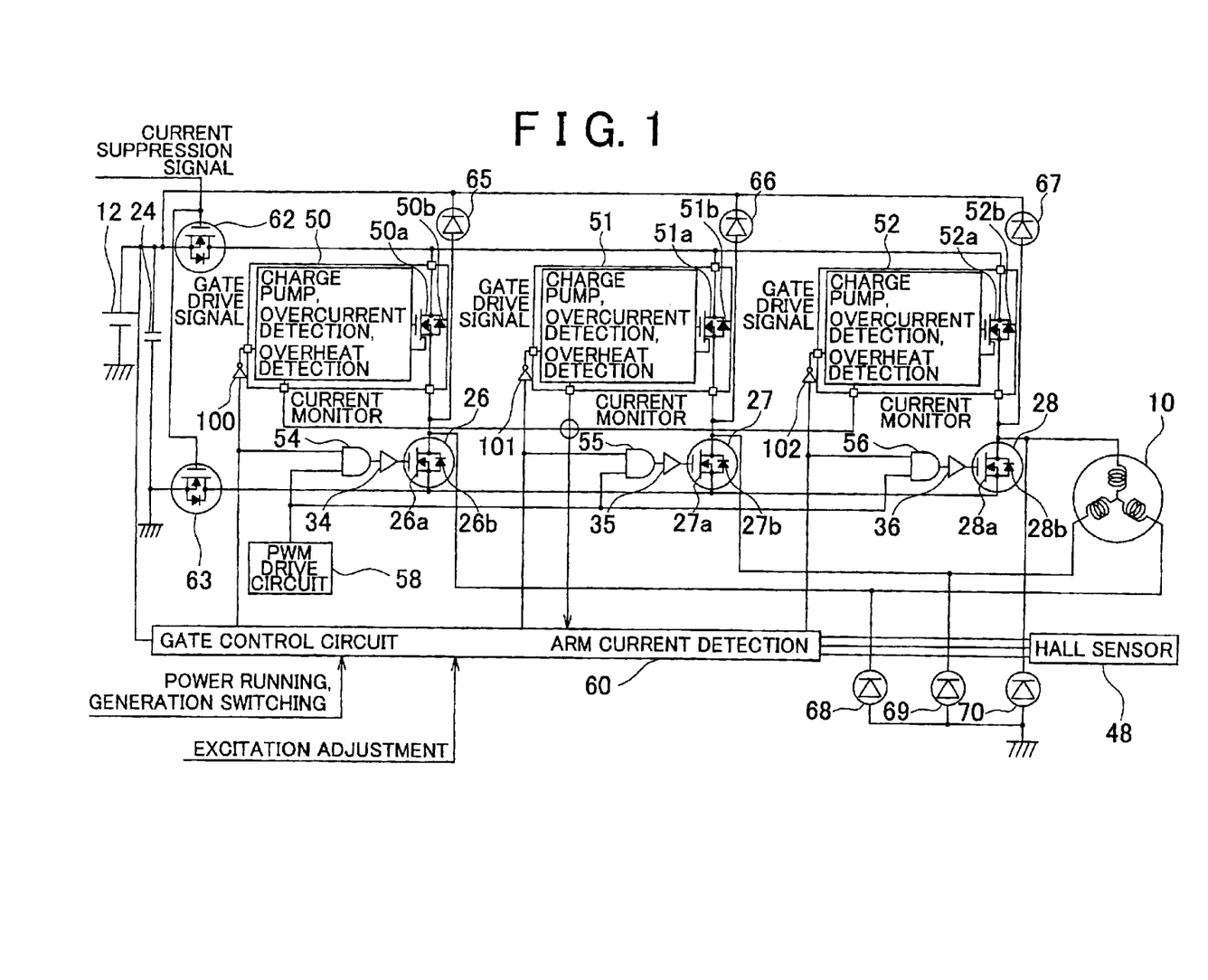
FIG. 1 is a circuit diagram of an inverter for a three phase alternating current generator-motor according to a first embodiment.

FIG. 1 is a circuit diagram of the inverter for the three phase alternating current generator-motor according to a first embodiment. In FIG. 1, a three phase alternating current generator-motor 10 functions as a starter motor and an alternator of a vehicle. A battery 12 serves as a charging-discharging unit. The inverter for the alternating current generator-motor of the first embodiment is connected between the three phase alternating current generator-motor 10 and the battery 12.

Hereafter follows an explanation of a connection configuration of the inverter. Intelligent Power Devices (IPDs) 50, 51 and 52, which are switching elements of an upper arm, and a MOS transistor 62, which is a current controller, connected in series thereto are connected between the three phase alternating current generator-motor 10 and a positive terminal of the battery 12. The IPDs 50, 51 and 52 are also referred to as multifunction switching elements and are provided with MOS type Field Effect Transistors (FETs) 50a to 52a, and body diodes 50b to 52b that are formed substantially between the source and drain of the FETs 50a to 52a, respectively. Each of the IPDs 50, 51 and 52 is also provided with a circuit that performs a gate drive boost function using a charge pump, an overcurrent and overheating detection function. That is, the overcurrent and overheating detection detects overcurrent and overheating of each of the FETs 50a to 52a is detected when the three phase alternating current generator-motor 10 has been made to operate as the starter motor.

Switching elements 26, 27 and 28 of a lower arm and a MOS transistor 63, which is a current control element, connected in series thereto are connected between the three phase alternating current generator-motor 10 and an earth. The switching elements 26, 27 and 28 are provided with MOS type FETs 26a to 28a, and body diodes 26b to 28b that are formed substantially between the source and drain of the FETs 26a to 28a, respectively.

An output terminal of a Pulse Width Modulation (PWM) drive circuit 58 and a gate drive signal output terminal of a gate control circuit 60 are connected to the respective gate terminals of the lower arm switching elements 26, 27 and 28 through buffers 34, 35 and 36, and AND circuits 54, 55 and 56. Furthermore, the gate drive signal output terminal of the gate control circuit 60 is connected to control signal input terminals of the upper arm IPDs 50, 51 and 52 through inversion elements 100 to 102, respectively.

Moreover, rectifying diodes 65, 66 and 67 of the three phase alternating current generator-motor 10 are connected respectively between each contact point for the upper arm IPDs 50 to 52 and the lower arm switching elements 26 to 28, and the contact point for the battery 12 and the switching element 62. Furthermore, rectifying diodes 68, 69 and 70 are connected respectively between each contact point of the upper arm IPDs 50 to 52 and the lower arm switching elements 26 to 28, and the earth.

The gate control circuit 60 carries out power running control, generation switching control or excitation adjustment control in response to an input of a power running control signal, a generation switching control signal or a excitation adjustment control signal. Furthermore, the gate control circuit 60, when the three phase alternating current generator-motor 10 is being made to operate as the generator, sets the IPDs 50 to 52, and the switching elements 26 to 28 to ON or OFF in response to a rotating angle of the three phase alternating current generator-motor 10 detected by a Hall sensor 48, or a current value detected (monitored) at the IPDs 50 to 52.

The PWM drive circuit 58 generates a PWM drive signal that repeats [L] and [H] acquired from a pulse width modulation a plurality of times, and supplies the signal to the AND circuits 54 to 56. As the gate drive signal is supplied to the AND circuits 54 to 56, each of output signals repeats [L] and [H] in the [H] level section where the gate drives signal from the gate control circuit 60 makes an FET operate. Thus, the output signal is supplied to the gate terminals of the FETs of the switching elements 26 to 28. This may allow the FETs of the switching elements 26 to 28 to carry out a high speed switching operation.

If, for example, a current path is set up where the FET 52a of the IPD 52 is connected in series to the FET 27a of the switching element 27 through a reactor of the three phase alternating current generator-motor 10, when the FET 52a of the IPD 52 enters an operational state, the switching element 27 carries out the high speed switching operation and a load current of the three phase alternating current generator-motor 10 is suppressed with high accuracy.

In the above-structured embodiment, the switching elements 62 and 63 are provided between the battery 12 and the lower and upper arms such that the switching elements 62 and 63 are blocked or suppressed when a generation operation is carried out. As a result, current that flows to the body diodes 50b to 52b of each switching element IPD 50 to 52 and 26b to 28b of each switching element 26 to 28 is blocked or suppressed.

Figure 2:
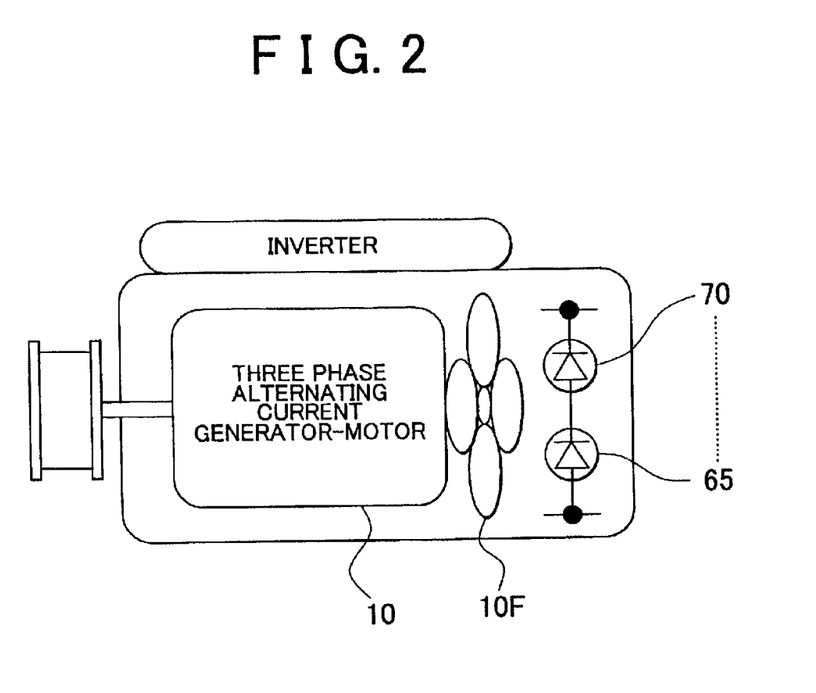
FIG. 2 is a view showing rectifying diodes of the three phase alternating current generator-motor in a casing, which are cooled by a fan provided therein.

Even if the current that flows to the body diodes 50b to 52b and 26b to 28b is interrupted or suppressed, current for battery charging flows to the rectifying diodes 65 to 70. Therefore, in this case, the rectifying diodes 65 to 70 generate heat. However, as FIG. 2 shows, the rectifying diodes 65 to 70 are provided in the same casing as the three phase alternating current generator-motor 10 so as to be cooled by a fan 10F. The resultant heat generation, thus, may be suppressed.

Figure 3:
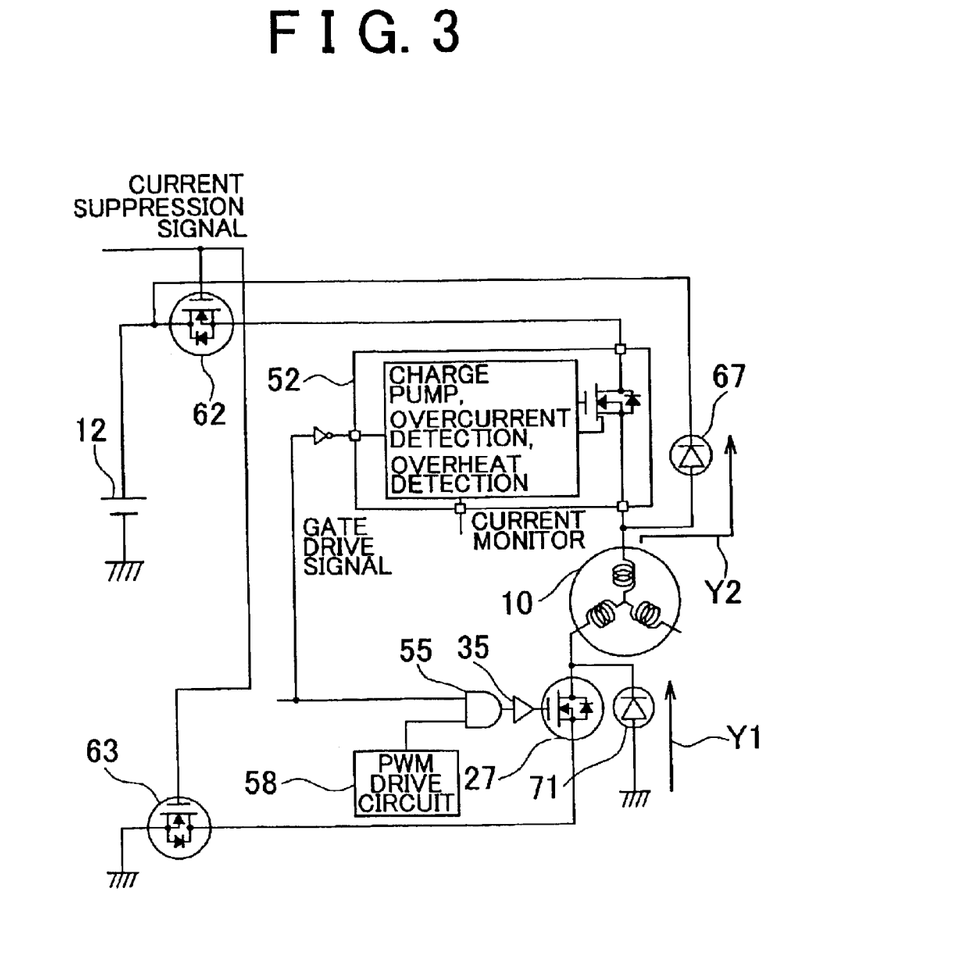
FIG. 3 is a circuit diagram of an essential portion of the inverter for the three phase alternating current generator-motor according to the first embodiment.

To make the explanation at this point simpler, the suppression control of the current will be explained with reference to FIG. 3, which is an essential portion of FIG. 1.

After the three phase alternating current generator-motor 10 has switched from functioning as the motor to functioning as the generator, the amount of generated current that flows from the generator-motor 10, which is functioning as the generator to the battery 12 as shown by arrows Y1 and Y2 increases as the amount of power generation increases. A current suppression signal controls in response to the amount of the generated current such that the gates of the MOS transistors 62 and 63 are gradually closed, and the MOS transistors 62 and 63 are set to a completely OFF state if the amount of the generated current equals or exceeds a predetermined threshold value.

The current suppression signal may, for example, use a signal that consists of an electrically converted engine speed. In other words, a correlation between the engine speed and the amount of the generated current is calculated and, in response to the generated current value increasing as the engine speed increases. The current suppression signal is used to control such that the gates of the MOS transistors 62 and 63 are gradually closed and the MOS transistors 62 and 63 are set to a completely OFF state if the engine speed equals or exceeds the predetermined threshold value.

In this kind of suppression control process, at the stage where the amount of the generated current is low, the generated current flows in parallel in both the rectifying diodes 67 and 71, and the body diodes of the upper and lower arm switching elements 52 and 27. The current flowing in the body diodes of the upper and lower arm switching elements 52 and 27, however, begins to decrease if the amount of the generated current value begins to gradually increase. Therefore, if the MOS transistors 62 and 63 are set to an OFF state, the current stops flowing in the body diodes of the upper and lower arm switching elements 52 and 27.

In this state, all of the generated current flows to the battery 12 through the rectifying diodes 67 and 71. As the rectifying diodes 67 and 71 are cooled by the fan 10F as described above, there is no breakage—causing heat generated from the current.

In this way, according to the inverter for the alternating current generator-motor of the first embodiment, the switching elements 26 to 28 and 50 to 52 for current control of the generator-motor 10 that functions as the alternating current motor or the alternating current generator are provided to constitute three phase alternating current generation. The current that flows to the body diodes 26b to 28b and 50b to 52b of the switching elements on electricity generation by the generator-motor 10 is suppressed by the switching elements 62 and 63 in response to the amount of power generation, and each of the body diodes 26b to 28b and 50b to 52b is connected in parallel to the rectifying diodes 65 to 70 of the generator-motor 10 so that the current on electricity generation flows despite the suppression.

In this way, using suppression control of the switching elements 62 and 63, the current that flows in each of the body diodes 26b to 28b and 50b to 52b of the switch elements 26 to 28 and 50 to 52 can be controlled so as to be reduced as the amount of power generation increases. Because the current can flow in the rectifying diodes 65 to 70 even during this suppression, sufficient electricity generation can be carried out while preventing overheating of each body diode 26b to 28b and 50b to 52b due to overcurrent.

Figure 4:
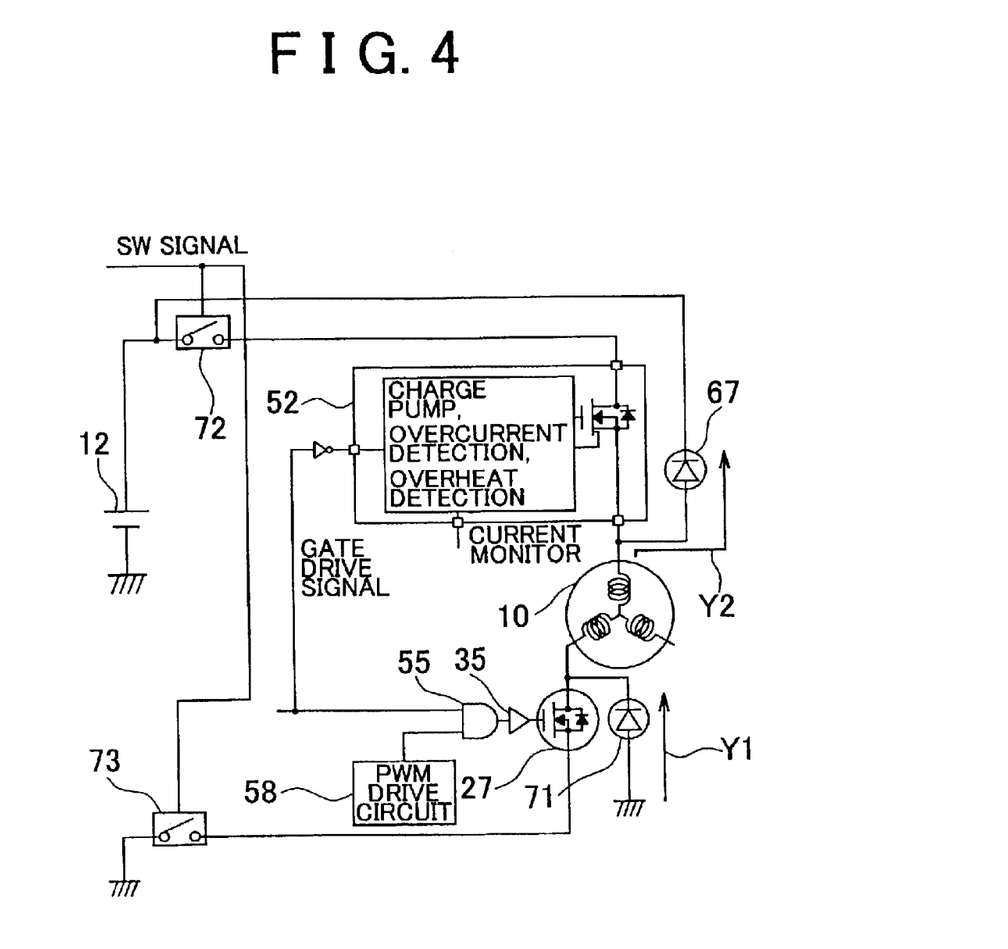
FIG. 4 is a circuit diagram of an inverter for a three phase alternating current generator-motor according to a modified example of the first embodiment.

FIG. 4 shows a modified example of the first embodiment. As FIG. 4 shows, ON/OFF switches 72 and 73 may be employed in place of the MOS transistors 62 and 63 that act as current control elements. In this case, the ON/OFF switches 72 and 73 carry out an ON/OFF operation of the current flow in response to a switch signal (hereafter referred to as the "SW signal").

The SW signal may be a determination signal indicating, for example, a complete combustion state of the engine. The current suppression control does not have to be carried out in the instant the switch from the motor to the generator has been taken place. This is because the body diodes 52b and 27b do not enter an overheated state in a short time even when generated current flows in the body diodes 52b and 27b of the upper and lower arm switching elements 52 and 27.

In this kind of ON/OFF control process using the SW signal, after the switch has taken place to the generator function, both the ON/OFF switches 72 and 73 become OFF at the point when the engine reaches complete combustion, and by doing so, the current stops flowing in the body diodes 52b and 27b of the upper and lower arm switching elements 52 and 27. Even in this modified example, sufficient electricity generation can be carried out while preventing overheating of each switching element 26 to 28 and 50 to 52 due to overcurrent.

Figure 5:
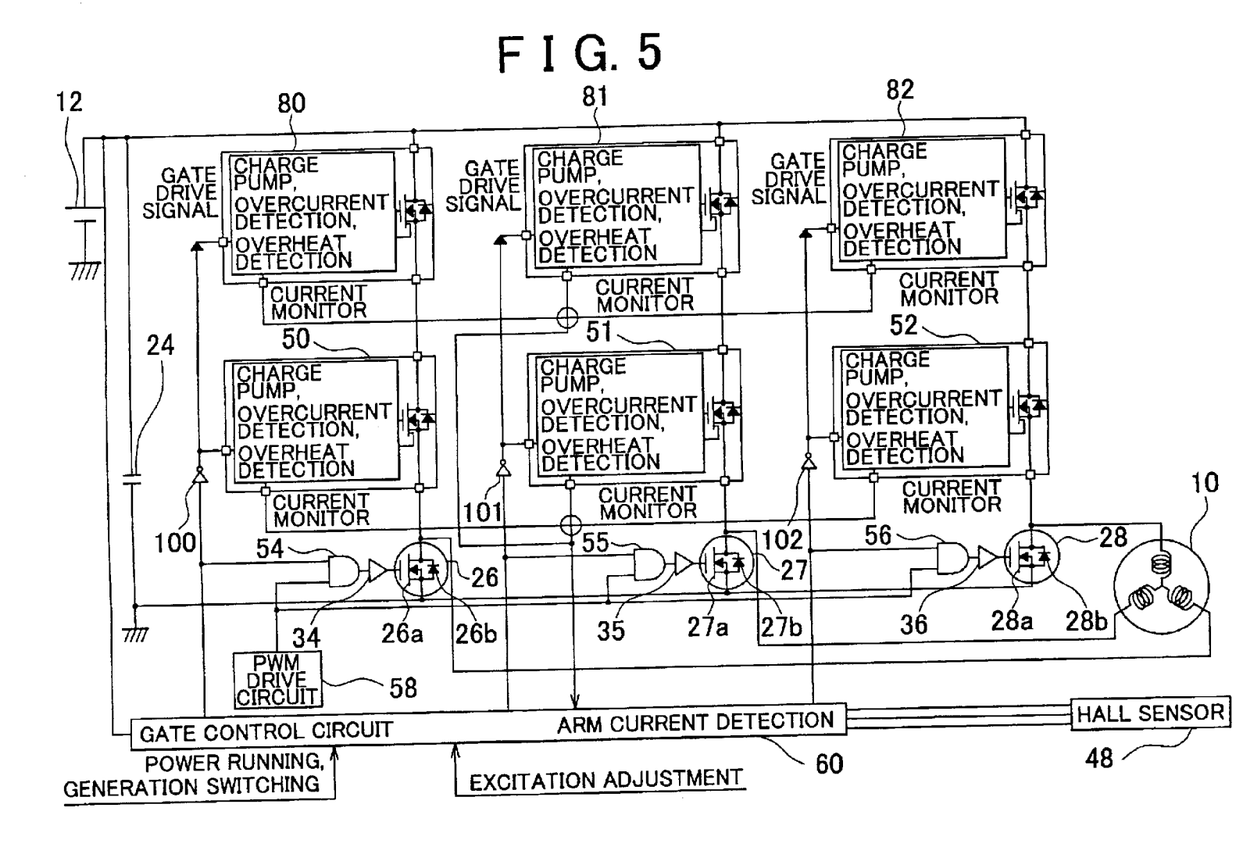
FIG. 5 is a circuit diagram of an inverter for an alternating current generator-motor to which a circuit of the first embodiment or the modified example thereof is applied.
Figure 6:
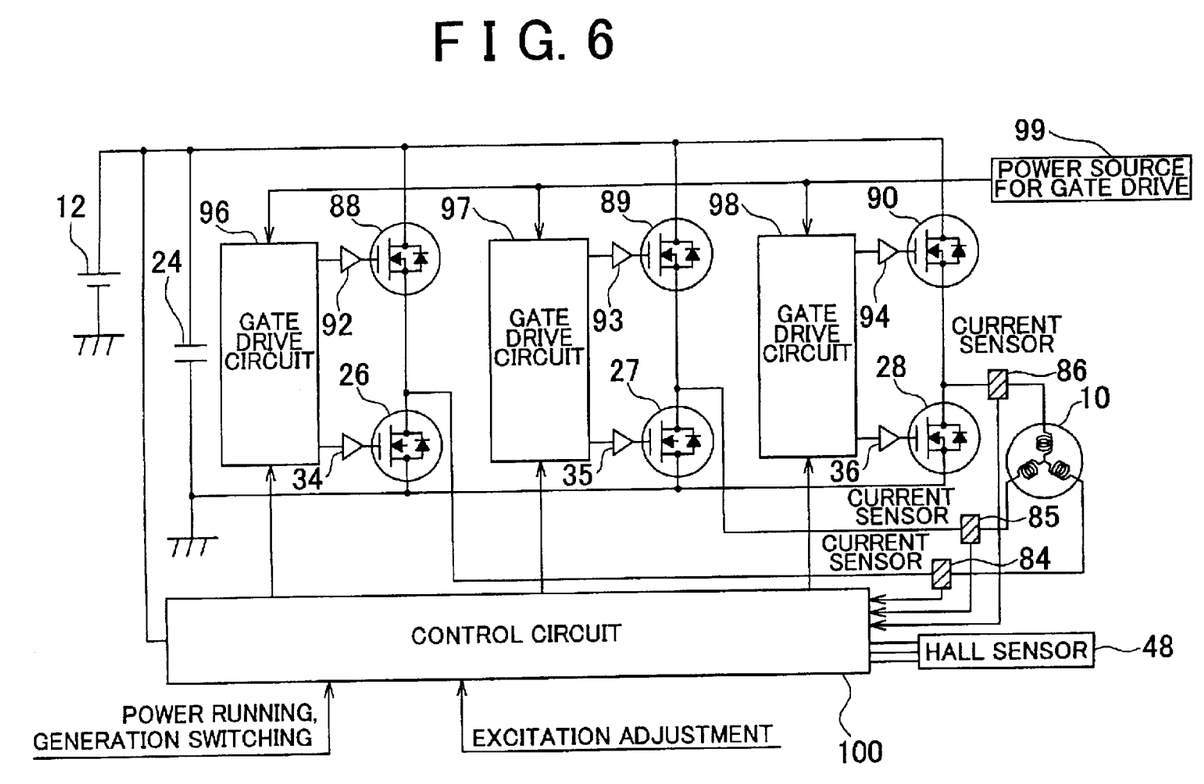
FIG. 6 is another circuit diagram of an inverter for an alternating current generator-motor to which the characteristic circuit of the first embodiment or the modified example thereof is employed.

Furthermore, an inverter for an alternating current generator-motor according to the invention may also have a configuration as shown in FIG. 5 or 6, to which a rectifying diode and a current controller for suppressing the current that flows in a body diode are added.

The inverter shown in FIG. 5 includes not only the IPDs 50 to 52 but also IPDs 80 to 82 as upper arm switching elements between the three phase alternating current generator-motor 10 and the battery 12. An essential portion of FIG. 5 will be explained with reference to FIG. 7

Figure 7:
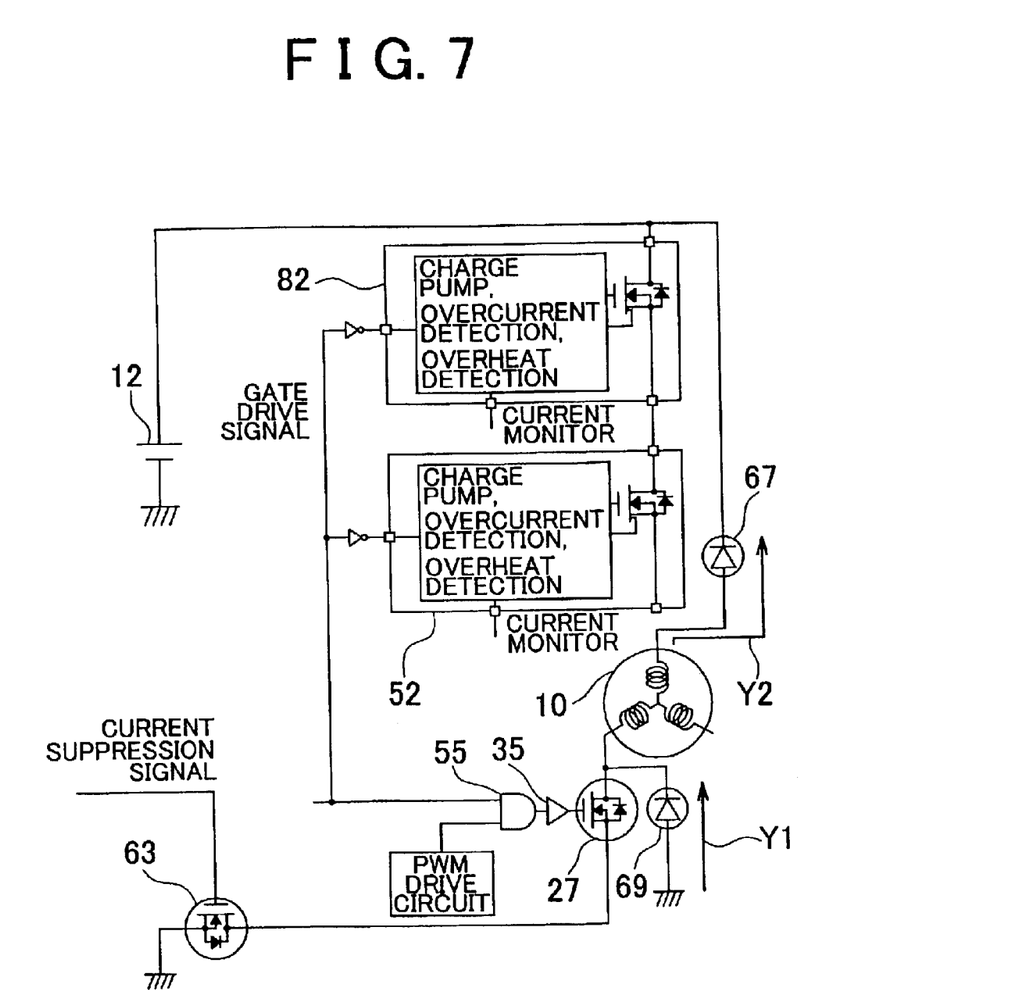
FIG. 7 is a view that shows a circuit of an essential portion of the circuit of the first embodiment that is employed in the inverter shown in FIG. 5.

As FIG. 7 shows, a rectifying diode 67 is connected in parallel to an end of both the serially connected upper arm IPDs 52 and 82. Furthermore, as explained in the first exemplary embodiment, the rectifying diode 69 is connected in parallel between the lower arm switching element 27 and the earth. The switching element 63 for current control is connected between the lower arm switching element 27 and the earth.

In the aforementioned structure, the current control switching element is not connected to the upper arm side as shown in FIG. 1. Referring to FIG. 7, the body diodes of the serially connected IPDs 52 and 82, and the rectifying diode 67 are connected in parallel. In other words, as each of the body diodes is connected in series, they have a resistance value twice that of the rectifying diode 67. Therefore, the current that flows from the reactor of the generator-motor 10 to the battery 12 may flow through the rectifying diode 67 as shown by an arrow Y2. This makes it possible to reduce heat generation because the current that flows in the serially connected body diodes can be reduced.

Even in this configuration, sufficient electricity generation can be carried out while preventing overheating of each of the switching elements 26 to 28, 50 to 52 and 80 to 82 due to overcurrent.

In the inverter shown in FIG. 6, upper arm switching elements 88 to 90 are connected through current sensors 84 to 86, respectively between the generator-motor 10 and the positive terminal of the battery 12, and the lower arm switching elements 26 to 28 are connected therebetween through a condenser 24 having one terminal earthed. Furthermore, gate drive circuits 96 to 98 are connected to the upper arm switching elements 88 to 90, and the lower arm switching elements 26 to 28 through the buffers 92 to 94 and buffers 34 to 36, respectively. A control circuit 100 is connected to the gate drive circuits 96 to 98, and the current sensors 84 to 86 and the Hall sensor 48. Therefore, a current controller and a rectifying diode are added to the above-structured inverter.

Figure 8:
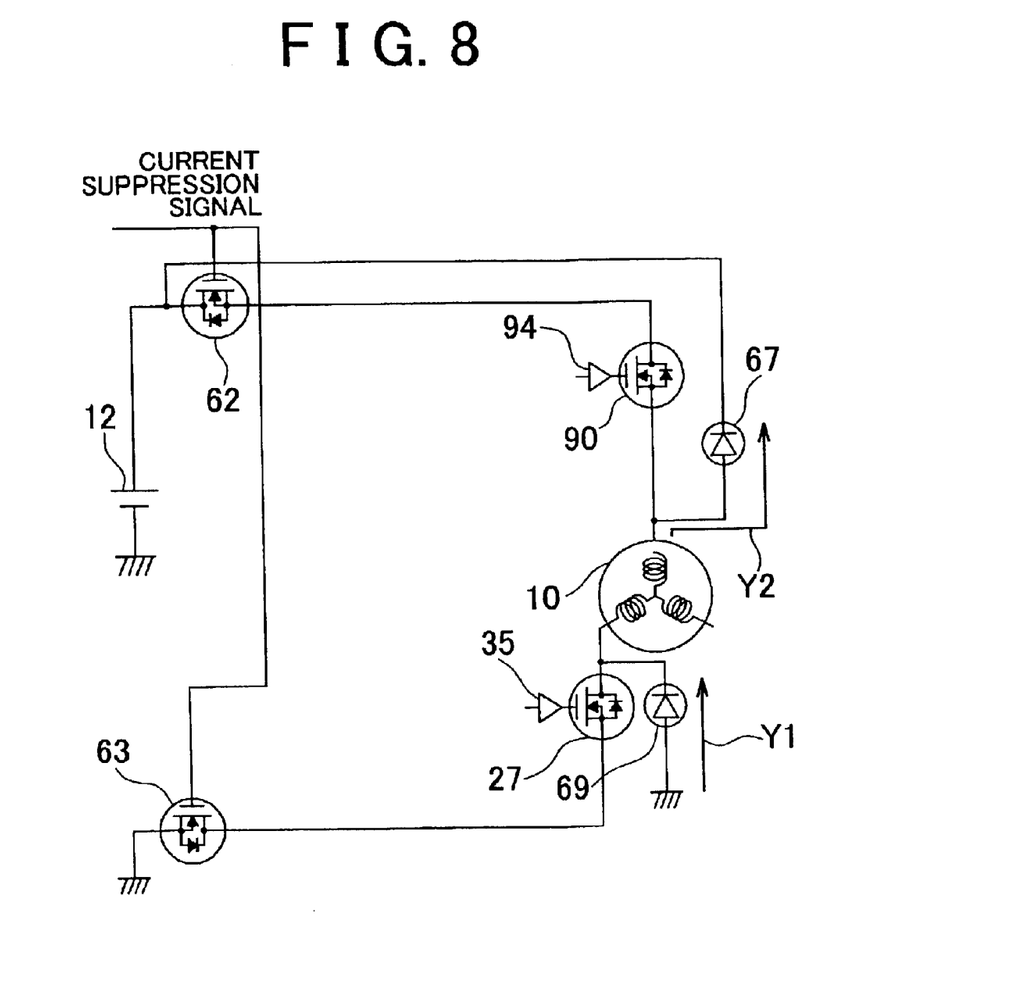
FIG. 8 is a view that shows a circuit of an essential portion of the circuit of the first embodiment that is employed in the inverter shown in FIG. 6.

FIG. 8 shows an essential portion of FIG. 6 in the case where the current controller and the rectifying diode have been added to the inverter. As FIG. 8 shows, the current control switching element 62 is connected between the upper arm switching element 90 and the battery 12, and the current control switching element 63 is connected between the lower arm switching element 27 and the earth. Furthermore, the rectifying diode 67 is connected between the generator-motor 10 and the upper arm switching element 90, and between the switching element 62 and the battery 12. Moreover, as explained in the first exemplary embodiment, the rectifying diode 69 is connected between the lower arm switching element 27 and the earth. Even in this configuration, sufficient electricity generation can be carried out while preventing overheating of each of the switching elements 88 to 90 and 26 to 28 shown in FIG. 6 due to overcurrent.

Second Embodiment

Figure 9A:
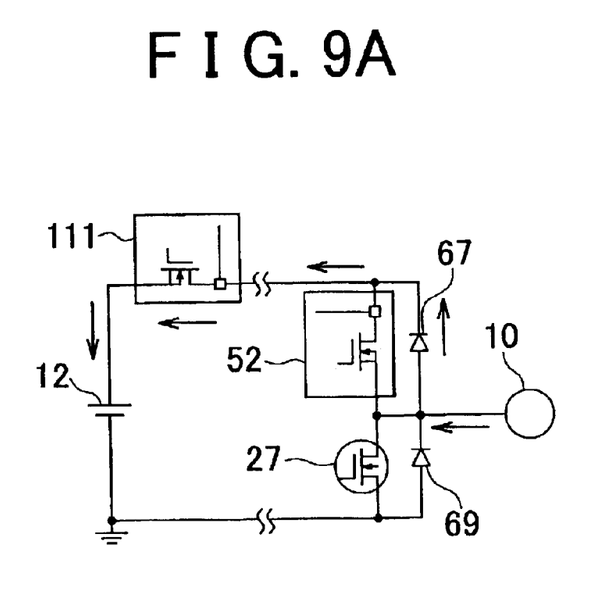
FIGS. 9A to 9C show each of the circuit diagrams of an inverter for a three phase alternating current generator-motor according to a second embodiment.
Figure 9B:
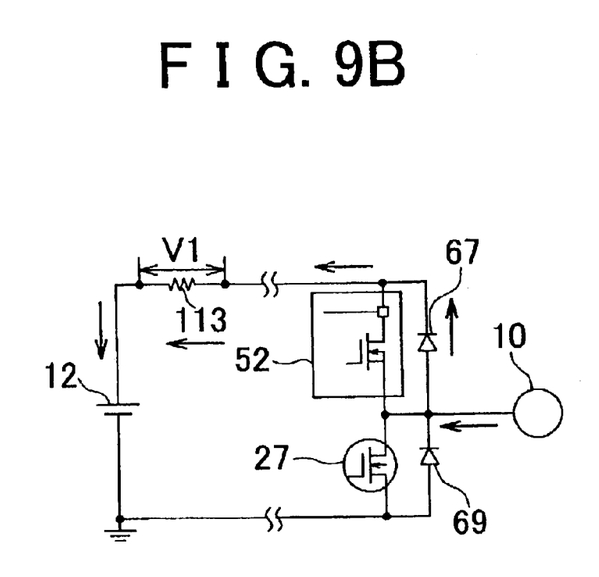
Figure 9C:
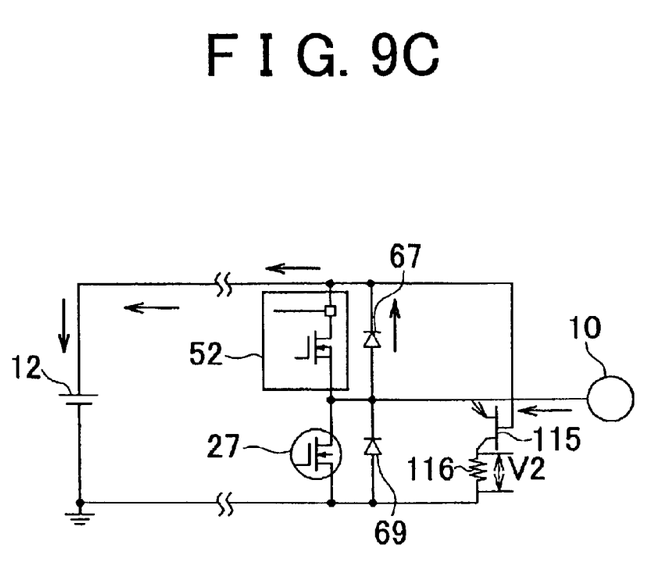

FIGS. 9A to 9C are circuit diagrams of inverters for a three phase alternating current generator-motor according to a second embodiment as shown in FIG. 1.

FIGS. 9A to 9C are circuit diagrams each showing the inverter to which a current detecting unit is connected. FIGS. 9A to 9C are simplified diagrams that omit a portion of the inverter of FIG. 1.

The inverter of FIG. 9A shows an IPD 111 that has the same function as that of the aforementioned current detector, which is connected to a positive terminal of the battery 12 on a current path of generated current between the generator-motor functioning as the generator and the battery 12 as shown by arrows. The FET source/drain connection for the IPD 111 is reversed to the FET source/drain connection of the IPD 52. This connection enables the generated current, in other words a value for the charging current to the battery 12, to be detected by a current detection function of the IPD 111 itself.

In the inverter shown in FIG. 9B, current detection is carried out by detecting a potential difference V1 of a resistance 113 of a predetermined section connected to the positive terminal of the battery 12 on the current path of generated current between the generator-motor 10 and the battery 12 as shown by arrows. A bus bar, for example, may be used for the current detection.

In the inverter shown in FIG. 9C, a current value that flows in a rectifying diode is detected by a current mirror circuit where a PNP type transistor 115 is connected in parallel with the rectifying diode 69. The current mirror circuit has a configuration whereby an emitter terminal of the PNP type transistor 115 is connected to a cathode of a rectifying diode 69, and a collector terminal is connected to an anode through a resistor 116. As the PNP type transistor 115 is connected in parallel to the rectifying diode 69, and a current that is proportional to the current flowing in the rectifying diode 69 is generated between the emitter and the collector of the PNP type transistor 115. The thus generated current undergoes potential conversion at the resistor 116, and current detection is carried out by detecting a potential difference V2 of both ends of the resistor 116.

Each of the current values detected by the inverters in FIGS. 9A to 9C is used to control an exciting current of the generator-motor 10, which is functioning as the generator. In other words, if a detected current that is at or above a predetermined value continues for a predetermined period of time, suppression of the charging current can be carried out by reducing the exciting current of the generator-motor 10.

In general, control of the charging current for a battery is achieved by controlling the exciting current in accordance with a voltage of the battery. If a state of charge (SOC) stored in the battery is low, however, the voltage will not rise even if the charging current flows. The current, thus, will continue to increase until the voltage rises. In this configuration, however, if the amount of power generation is controlled in accordance with the detection value of the current detection unit, overcurrent can be prevented even when the voltage of the charging-discharging unit is low. As a result, there is no element breakage or reduction in durability of a harness.

According to the inverter for the alternating current generator-motor shown in FIG. 9A, the IPD 111 that performs a switching operation is connected on the current path between the generator-motor 10 and the battery 12 that is charged by the generated current from the generator-motor 10, which is functioning as the generator. The generated current, in other words, a value for the charging current to the battery 12, can be detected by the current detection function of the IPD 111 itself. Therefore, detection of the generated current can be carried out simply by an inexpensive IPD.

Furthermore, according to the current detection unit in the inverter shown in FIG. 9B, the potential difference V1 of the resistance 113 of the predetermined section on the current path between generator-motor 10 and the battery 12 that is charged by the generated current from the generator-motor 10, which is functioning as the generator, is detected so as to carry out current detection. Therefore, detection of the charging current can be carried out by an inexpensive and simple configuration.

Furthermore, according to the current detection unit shown in FIG. 9C, the PNP type transistor 115 is connected in parallel to both ends of the rectifying diode 69 of the generator-motor 10 through the resistor 116. This may form the current mirror circuit that generates the current proportional to the current flowing in the rectifying diode 69 in the PNP type transistor 115. The thus generated current is detected using the potential difference V2 of the resistor 116. Therefore, detection of the charging current can be carried out by an inexpensive and simple configuration An inverter for the alternating current generator-motor of the invention is provided with rectifying diodes, which are connected in parallel to body diodes of switching elements, and a current controller that suppresses current flowing to the body diodes when the generator-motor is generating electricity. This makes it possible to suppress the current that flows in the body diodes. Therefore, it is possible to carry out sufficient electricity generation while preventing overheating due to overcurrent of the body diodes.

What is claimed is:

1. An inverter for an alternating current generator-motor, the inverter being connected between the alternating current generator-motor and a charging-discharging unit, comprising:

a plurality of switching elements, each of which is controlled to convert a direct current electricity supplied from the charging-discharging unit into a three phase alternating current electricity so as to be supplied to the alternating current generator-motor that is functioning as a motor;

a plurality of body diodes connected to the plurality of switching elements correspondingly, each of the plurality of body diodes being operative to convert the alternating current generated by the alternating current generator-motor that is functioning as a generator into the direct current so as to be supplied to the charging-discharging unit;

a plurality of rectifying diodes connected in parallel with the corresponding plurality of body diodes; and at least one current controller that suppresses a flow of an electric current to each of the body diodes when the alternating current generator-motor generates electricity.

2. An inverter according to claim 1, wherein the alternating current generator-motor comprises a three phase alternating generator-motor that serves as a starter motor and an alternator of a vehicle.

3. An inverter according to claim 1, wherein the charging-discharging member comprises a battery.

4. An inverter according to claim 2, wherein the charging-discharging member comprises a battery.

5. An inverter according to claim 1, wherein the current controller is operative to interrupt a flow of the current directed to each of the plurality of body diodes when the alternating current generator-motor generates electricity.

6. An inverter according to claim 5, wherein the current controller comprises at least one of a transistor and an ON/OFF switch.

7. An inverter according to claim 1, further comprising a current detector that detects a current flowing to the charging-discharging unit when the alternating current generator-motor generates electricity, wherein an amount of generated electricity is controlled in accordance with a detected value of the current detector.

8. An inverter according to claim 7, wherein the current detector comprises a multi-functioning switching element that includes a transistor provided on a current path between the charging-discharging unit and the rectifying diode so as to be operative to perform switching operation, and performs functions of charge pump, current detection and heat detection.

9. An inverter according to claim 7, wherein the current detector detects a potential difference generated in a predetermined section on the current path between the charging-discharging unit and the rectifying diode so as to calculate a current value on the basis of the detected potential difference and a resistance of the predetermined section.

10. An inverter according to claim 7, wherein the current detector comprises a transistor connected in parallel with the rectifying diode.

11. An inverter according to claim 5, further comprising a current detector that detects a current flowing to the charging-discharging unit when the alternating current generator-motor generates electricity, wherein an amount of generated electricity is controlled in accordance with a detected value of the current detector.

12. An inverter according to claim 11, wherein the current detector comprises a multi-functioning switching elements that includes a transistor provided on a current path between the charging-discharging unit and the rectifying diode so as to be operative to perform switching operation, and performs functions of charge pump, current detection and heat detection.

13. An inverter according to claim 11, wherein the current detector detects a potential difference generated in a predetermined section on the current path between the charging-discharging unit and the rectifying diode so as to calculate a current value on the basis of the detected potential difference and a resistance of the predetermined section.

14. An inverter according to claim 11, wherein the current detector comprises a transistor connected in parallel with the rectifying diode.

* * * * *